Aug. 20, 1957     S. FORMAN     2,803,366
COMBINATION POT AND HOLDER
Filed April 6, 1954
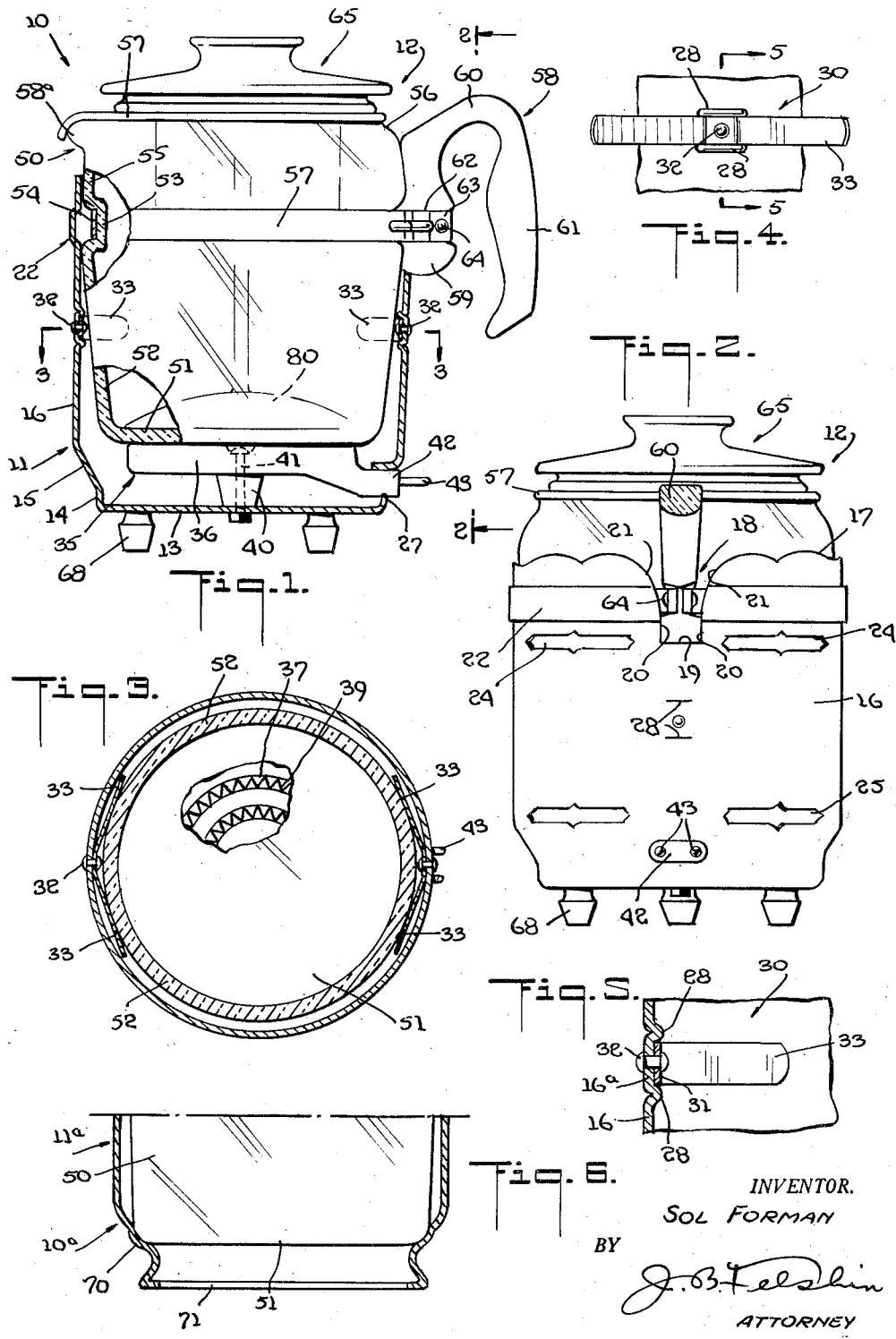
INVENTOR.
SOL FORMAN
BY
J. B. Felshin
ATTORNEY

United States Patent Office 2,803,366
Patented Aug. 20, 1957

2,803,366

COMBINATION POT AND HOLDER

Sol Forman, New York, N. Y., assignor to Forman Family, Inc., Brooklyn, N. Y., a corporation of New York Application April 6, 1954, Serial No. 421,313

5 Claims. (Cl. 215—12)

This invention relates to a combination pot and holder. It is particularly directed to a pot made of vitreous material removably mounted within a metal holder, the pot being adapted to be heated for boiling water therein or for percolating coffee or for brewing tea, or for like purposes.

An object of this invention is to provide a combination pot and holder of the character described, in which the pot comprises a receptacle to which is attached a handle, the holder comprising a metal member in which the pot is received, with the upper end of the pot exposed above the upper end of the holder, and said holder being provided with highly improved spring means to resiliently and frictionally engage opposite sides of the pot, so that when the pot is lifted by its handle, the holder will be lifted therewith.

A further object of this invention is to provide a device of the character described in which the holder has a notch at its upper end to receive a portion of the handle, whereby to permit the pot to be inserted into the holder.

Still another object of this invention is to provide a combination device of the character described in which the holder is provided with a pair of oppositely disposed double winged leaf springs gripping opposite sides of the pot to center it and to prevent the pot from being jammed within the holder whereby to facilitate removal of the pot from the holder for cleaning purposes.

In accordance with one form of the invention, the holder may have a closed bottom with an electric heater mounted within the bottom of the holder, said pot being adapted to rest on the heater when said pot is inserted within the holder. In another form of the invention, the bottom of the holder is open and said holder is provided with an annular shoulder on which the bottom of the pot rests to keep the bottom of the pot above the bottom of the holder.

Still a further object of this invention is to provide a strong, rugged, durable and attractive combination device of the character described, which shall be relatively inexpensive to manufacture, easy to manipulate, and practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the appended claims.

In the drawings:

Fig. 1 is a side view of a combination pot and holder embodying the invention and showing the holder in vertical cross-section;

Fig. 2 is a sectional view taken on line 2—2 of Fig. 1;

Fig. 3 is a sectional view taken on line 3—3 of Fig. 1;

Fig. 4 is a partial inside elevational view of a portion of the holder;

Fig. 5 is a sectional view taken on line 5—5 of Fig. 4;

Fig. 6 is a view of the lower end of the pot and holder illustrating a modified construction of the holder and showing the holder in vertical cross-section.

Referring now in detail to the drawings, 10 designates a combination pot and holder embodying the invention and comprising generally a holder 11 containing a pot 12 therein. The holder 11 may be made of metal. The same comprises a bottom wall 13 from which extends upwardly a short vertical annular portion 14. Extending upwardly from the vertical portion 14 is an outwardly and upwardly flaring annular portion 15. Extending from the upper end of the flaring portion 15 is a cylindrical portion 16 having an upper edge 17. The upper edge 17 may be scalloped or ornamentally shaped if desired.

The rear upper end of the cylindrical portion 16 is formed with downwardly extending notch 18 having a bottom horizontal edge 19. Extending upwardly from the outer end of the edge 19 are parallel edges 20 which merge with upwardly and outwardly curved edges 21 extending to the upper edge 17 of the holder. The holder may be formed with outwardly pressed annular reinforcing portion 22 near its upper end. The outwardly pressed portion 22 is located in a horizontal plane and extends to the inner edges 21 of the notch 18. The holder 16 is also formed with angularly spaced, horizontal openings 24 located substantially at the level of the lower end of the notch 18, and also with annularly disposed horizontal openings 25 located adjacent the lower end of the cylindrical wall 16. The flaring wall 15 is furthermore formed with an opening 27 for the purpose hereinafter appearing. The purpose of these openings 24, 25, 27 will be explained hereinafter.

Wall 16 of the holder is furthermore formed at the rear and at the front with two pairs of spaced horizontal inwardly pressed beads or ridges 28. These ridges are located below the level of the lower end of the notch 18.

Attached to the wall 16 between each pair of ridges 28 is a spring 30. Spring 30 is made of a single strip of spring steel or the like material. It comprises a central portion 31 which contacts the portion 16a of wall 16 between the ridges 28. The central portion 31 of the spring 30 is fixed to the wall portion 16a by a rivet 32. Extending outwardly from the central portion of each spring 30 are a pair of diverging spring tongues or wings 33. The purpose of the springs 30 will be explained hereinafter.

Fixed to the bottom wall 13 is an electrical heating unit 35. Said unit may be of usual construction and comprises a member 36 of heat insulating material formed in its upper face with a groove 37 to receive an electric heating element 39. Between member 36 and the bottom wall 13 is a spacer 40. A center bolt 41 serves to fasten the member 36 and the spacer 40 to the center of the bottom wall 13. Said center bolt passes through aligned openings in member 36, spacer 40 and bottom wall 13. The member 36 has a projection 42 passing through the opening 27 and carries the usual prongs 43 which are electrically connected to the heating element 39. The prongs 43 of course may be received in a socket of a usual electric connector cord for plugging the heating member to a wall outlet socket.

The pot 12 comprises a receptacle or pot body 50 which may be made of glass, such as "Pyrex" and is hence heat resisting. Said pot 50 has a bottom wall 51 which may rest on the electric heating unit 35. Extending upwardly from the bottom wall 51 is an annular wall 52. The wall 52 may be tapered upwardly slightly, if desired. The upper end of the tapered wall 52 has an annular inwardly pressed portion 53 and forming an annular external groove 54. Extending upwardly from the inwardly pressed portion 53 is a cylindrical portion 55. The upper end of the glass receptacle or pot body 50 may be inwardly curved as at 56. Said receptacle has an upper edge 57 and may be formed with a spout 58a.

It will be noted that the inwardly pressed portion 53 is substantially at the level of the outwardly pressed portion 22 of the holder.

Attached to the receptacle 50 by means of a metal strap 57 is a handle 58. Handle 58 may likewise be made of glass or any other suitable heat insulating material. Handle 58 has a portion 59 contacting the receptacle 50 at the rear thereof and disposed within or projecting into the notch 18. Extending from the upper end of portion 59 is a bent back portion 60 from which extends downwardly a hand grip portion 61. The metal strap 57 extends around the receptacle 50 within the groove 54 and has end strap portions 63 extending around portion 59 of the handle 58. Said portion 59 is also grooved as at 62 to receive the end portions 63 of the metal strap. The metal strap portions 63 are interconnected by a rivet 64 thus fixing the handle 58 rigidly to the receptacle 50.

It will be noted that the wings 33 of the springs 30 resiliently and frictionally grip or press against opposite sides of wall 52 of the receptacle 50 so as to releasably hold the receptacle within the holder. Thus when the handle 58 is grasped and the device lifted, the pot and holder are held together. The springs 30 are oppositely disposed and grip opposite portions of the pot thus preventing jamming, but still permitting the pot to be readily removed or pulled out of the holder when desired.

A cover 65 may be provided for the pot as shown in the drawing. Insulated legs 68 may be attached to the bottom wall 13.

While the device 10 is shown with an electric heating unit incorporated therein, a modified form of the invention is shown in Fig. 6. The device 10a of Fig. 6 is similar to device 10 with the exception that the receptacle 50 rests on an internal annular shoulder 70 of the holder 11a. Furthermore the holder 11a has an opening 71 at the bottom. It will be noted that the shoulder 70 holds the bottom wall 51 of the receptacle in spaced relation above the lower end of the holder 11a.

It will now be understood that the pot 50 may be removed from holder 11 and placed on a gas stove or an electric stove for heating water in the pot 50. It will be further understood that the usual coffee percolating accessories 80 may be placed within the pot 50 so that the device may be used as a coffee percolator. Of course this pot can be used for boiling water, for brewing tea, for cooking and for various like purposes. When the beverage is ready to serve, pot 50 is replaced within holder 11. The openings 24 and 25 permit the user to look through the holder and see the color of the coffee as it is being percolated or the color of the tea as it is being brewed. This is so because the receptacle 50 is made of transparent material. The openings 24, 25 also permit the user to observe the level of the liquid within pot 50. The lower openings 25 further allow circulation of air between holder 11 and pot 50 to maintain holder 11 cool and thereby prevent injury to the table top surface on which holder 11 is placed.

It will be further noted that the upper portion of the receptacle 50 projects above the upper end of the holder while the major portion of the receptacle is within the holder.

It will thus be seen that there is provided a device in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

Having thus described the invention in some detail, what is claimed as new, is:

1. In combination, a metal holder having an annular wall, a receptacle of transparent material disposed within said holder, the upper end of the receptacle projecting above the upper end of the holder, said holder having a notch at the rear of its upper end, a handle rigidly fixed to said receptacle and having a portion projecting through said notch and a portion disposed above the holder, a first spring attached to the inside of the holder below the notch and having spring tongues engaged below the notch and a second spring attached to the inside of the holder and being disposed in opposed relation to the first spring and said springs each having spring tongues engaging an unbroken, ungrooved smooth surface of said receptacle to hold it by resilient friction.

2. The combination of claim 1, said receptacle being formed with an annular outer depressed groove disposed below the upper end of said holder and the rigid connection between the handle and said receptacle comprising a strap received in said annular groove and said strap having a portion fixed to said handle.

3. The combination of claim 2, said holder being formed with ridges engaging opposite edges of each spring to keep the spring from turning.

4. In combination, a metal holder having a cylindrical wall, a receptacle of transparent vitreous material disposed within the holder, the upper end of the receptacle projecting above the upper end of the holder, said holder having a notch at the rear of its upper end, a handle rigidly fixed to said receptacle and having a portion projecting through said notch and a portion disposed above the holder, a first spring attached to the inside of the rear of the holder below the notch and having spring tongues engaging the receptacle, and a second spring attached to the inside of the front of the holder and being disposed at the level of the first spring and having spring tongues engaging an unbroken, ungrooved smooth surface of said receptacle to hold it by resilient friction only.

5. The combination of claim 4, said holder being formed with openings adjacent its upper and lower ends through which liquid within the pot may be viewed.

References Cited in the file of this patent

UNITED STATES PATENTS

| | | |
|---|---|---|
| 645,626 | Mills | Mar. 20, 1900 |
| 1,073,897 | Goss | Sept. 23, 1913 |
| 1,121,575 | Abtmeyer | Dec. 15, 1914 |
| 1,517,436 | Kocjan | Dec. 2, 1924 |
| 1,718,118 | Deck | June 18, 1929 |
| 1,922,729 | Geibel | Aug. 15, 1933 |
| 1,924,011 | Willmott | Aug. 22, 1933 |
| 1,980,715 | Brosler | Nov. 13, 1934 |
| 2,283,734 | Hoffeld | May 19, 1942 |
| 2,573,237 | Wilcox | Oct. 30, 1951 |